United States Patent [19]
Totten et al.

[11] Patent Number: 5,521,595
[45] Date of Patent: May 28, 1996

[54] ILLUMINATED HAZARD WARNING DEVICE

[76] Inventors: George L. Totten, 8 Coronation Crescent, Cobourg, Ontario K9A 1T4; Trevor W. Stewart, 990 Division St., Cobourg, Ontario K9A 4J9, both of Canada

[21] Appl. No.: 344,405

[22] Filed: Nov. 23, 1994

Related U.S. Application Data

[63] Continuation-in-part of Ser. No. 194,795, Feb. 10, 1994, abandoned, which is a continuation-in-part of Ser. No. 990,626, Dec. 14, 1992, abandoned.

[51] Int. Cl.⁶ .................................................. G08G 1/095
[52] U.S. Cl. ................. 340/908; 340/908.1; 340/932; 340/321; 362/186; 362/158; 362/190
[58] Field of Search ..................... 340/908, 908.1, 340/932, 321; 362/158, 265, 186, 216, 190, 183, 206, 310, 390, 295, 157, 268; 116/202; 200/60

[56] References Cited

U.S. PATENT DOCUMENTS

| | | | |
|---|---|---|---|
| 3,735,115 | 5/1973 | Adler, Jr. | 340/908.1 |
| 3,738,309 | 6/1973 | Nicholl | 340/908.1 |
| 4,142,179 | 2/1979 | Lowndes | 340/321 |
| 4,286,310 | 8/1981 | Brainkel et al. | 362/186 |
| 4,428,034 | 1/1984 | Seller | 362/186 |
| 4,563,668 | 1/1986 | Martino | 340/908.1 |
| 4,864,299 | 9/1989 | Kuhl | 340/908.1 |
| 4,868,458 | 9/1989 | Davenport et al. | 315/77 |
| 5,134,558 | 7/1992 | Williams et al. | 362/263 |
| 5,136,475 | 8/1992 | McDermott | 362/158 |

FOREIGN PATENT DOCUMENTS

| | | | |
|---|---|---|---|
| 1062677 | 9/1979 | Canada | 340/908.1 |
| 2140547 | 11/1984 | United Kingdom | 340/908.1 |

OTHER PUBLICATIONS

Consumer Reports, Apr. 1992, Emergency! Handling Trouble on the Road pp. 248–250.

Primary Examiner—Brent A. Swarthout
Assistant Examiner—Nina Tong
Attorney, Agent, or Firm—Sanford J. Piltch

[57] ABSTRACT

A self or internally powered electric strobe-type illumination beacon for use in connection with hazard-warning, navigation or any other activity requiring the temporary placement of an illumination device having a switch means operable by rotating the top section about the bottom section enabling the repeated pulsing of the lamp means for light emissions.

8 Claims, 4 Drawing Sheets

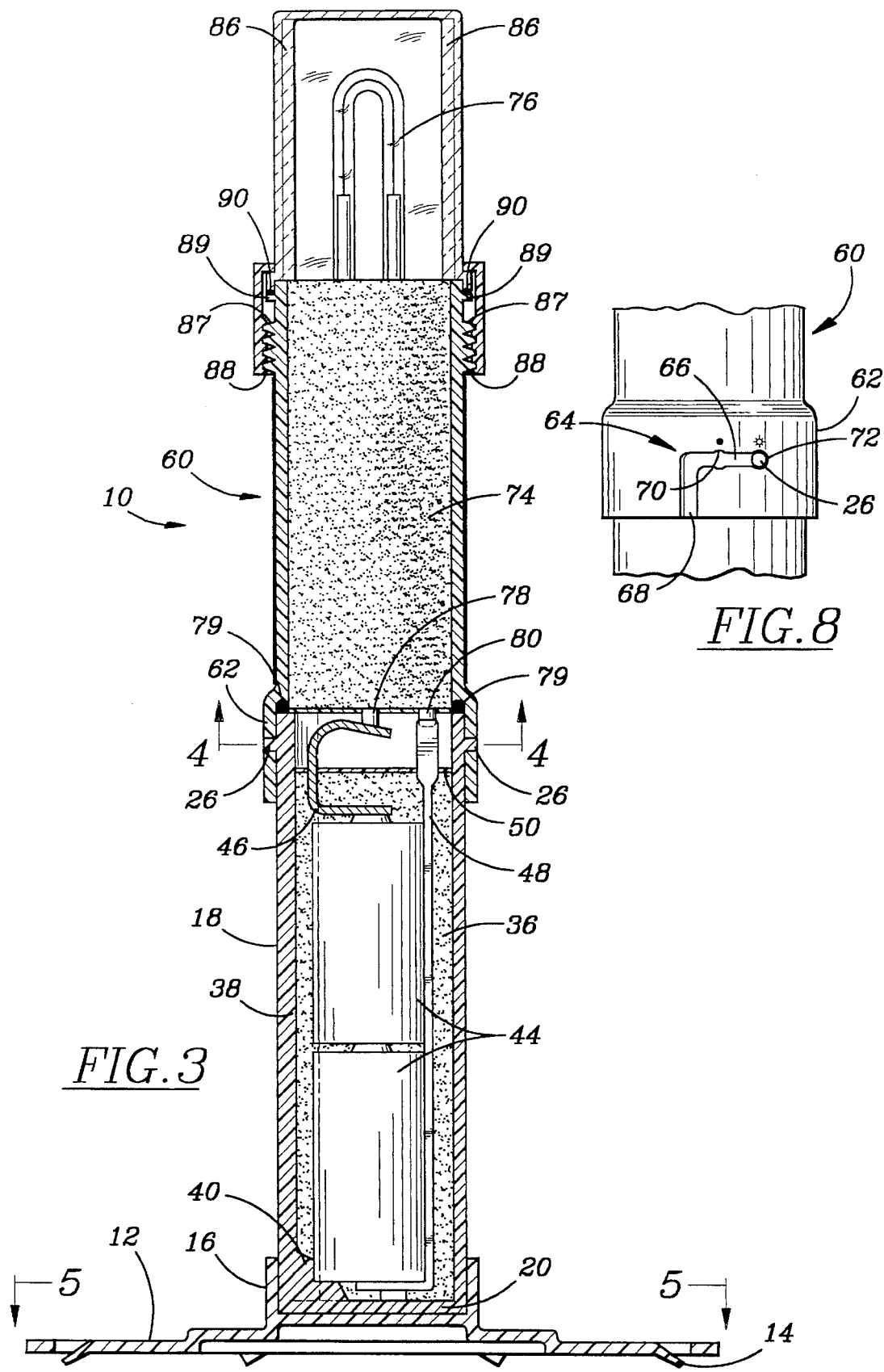

5,521,595

ILLUMINATED HAZARD WARNING DEVICE

CROSS-REFERENCE TO RELATED APPLICATIONS

This application is a continuation-in-part of U.S. patent application Ser. No. 08/194,795, filed Feb. 10, 1994 which was a continuation-in-part of U.S. patent application Ser. No. 07/990,626, filed Dec. 14, 1992, both now abandoned.

FIELD OF THE INVENTION

The present invention generally relates to illuminated hazard-warning devices, and more particularly to self or internally powered electric strobe-type illuminated beacon for use in connection with hazard-warning, navigation or any other activity requiring the temporary placement of an illumination device.

BACKGROUND OF THE INVENTION

Flashing light beacons are among the most widely used temporary warning devices used to alert the public to the presence of traffic accidents, road and navigational hazards and other physical situations where some degree of caution by the public may be required. These beacons are typically provided with a power source, such as a storage battery, a light source and means for intermittently interrupting the flow of energizing current to the light source. For the light source, many of these beacons use a xenon gas filled light bulb of the type widely used in photographic applications to provide short, intense flashes of light. When the xenon gas pressure is fairly low, such bulbs emit bluish white light when energized. With a higher integral gas pressure, a white light resembling daylight is emitted. At night and even in daylight, the flashing of higher gas pressure lights can be easily observed from distances sufficient to give an observer ample warning to avoid such hazards. Present state-of-the-art beacons are not usually hand held because of the weight of the storage battery and the configuration of the lighting assembly, including the base.

Commercially available beacons are presently provided with discrete on-off switches which, unless the electrical connections are protected against adverse environmental effects, tend to corrode over time. Such corrosion will eventually result in a mechanical or electrical failure of the switch. This can occur even if the switch connections are routinely cleaned and ultimately require replacement. However, experience has shown that routine cleaning is not the norm and corroded connections to these on-off switches are not usually detected until they fail in service. In many circumstances, such a failure can result in serious potential consequences.

SUMMARY OF THE INVENTION

The present invention is a self-powered strobe-type beacon for use in hazard warning, navigation or any other application requiring the temporary placement of an illumination device with a controlled strobe-like illumination pattern. The beacon comprises a power source and a pulsed xenon lamp packaged in a two-piece tubular housing adapted to be self-standing and portable. The lower tubular section containing the power source, typically a battery or other energy producing means, being firmly attached to a stand or other support configured to allow said beacon to be vertically stable in a variety of weather conditions and deployed surfaces. The upper tubular section contains the xenon light source and the control circuitry for measuring the timing and duration of the strobe lamp flashes, with a lens means which is threadedly detachable from the upper tubular section. The two tubular sections are held together by a push and twist bayonet locking mechanism, said push and twist mechanism further incorporating switch means for energizing the circuitry and the lamp operable by a counter-rotational motion of the upper and lower tubular sections of the beacon. The lamp housing used to protect the xenon light source is further configured so that the illuminating beam is projected substantially 360° horizontally. Depending upon the expected end use of the device, the lamp housing may be of either a clear or colored transparent structure, e.g. glass or plastic materials, with the lamp housing or lens means being substitutable for the permitting of all or predetermined wavelengths of light to pass through such lamp housing.

BRIEF DESCRIPTION OF THE DRAWINGS

For the purposes of illustrating the present invention, there is shown in the drawings forms which are presently preferred; it being understood, however, that the invention is not limited to the precise arrangements and instrumentalities shown.

FIG. 3 is a vertical cross sectional view of the illumination device taken along the line 3—3 in FIG. 1.

FIG. 4 is a horizontal cross sectional view of the illumination device taken along the line 4—4 in FIG. 3.

FIG. 6 is a partially cutaway view of the lamp and lamp enclosure of the illumination device.

FIG. 8 is an partial horizontal view showing the joining of the upper and lower body section of the beacon of FIG. 1

DETAILED DESCRIPTION OF THE PRESENT INVENTION

The following detailed description is of the best presently contemplated mode of carrying out the present invention. This description is not intended in a limiting sense, but is made solely for the purpose of illustrating the general principles of the invention.

Figure 1:
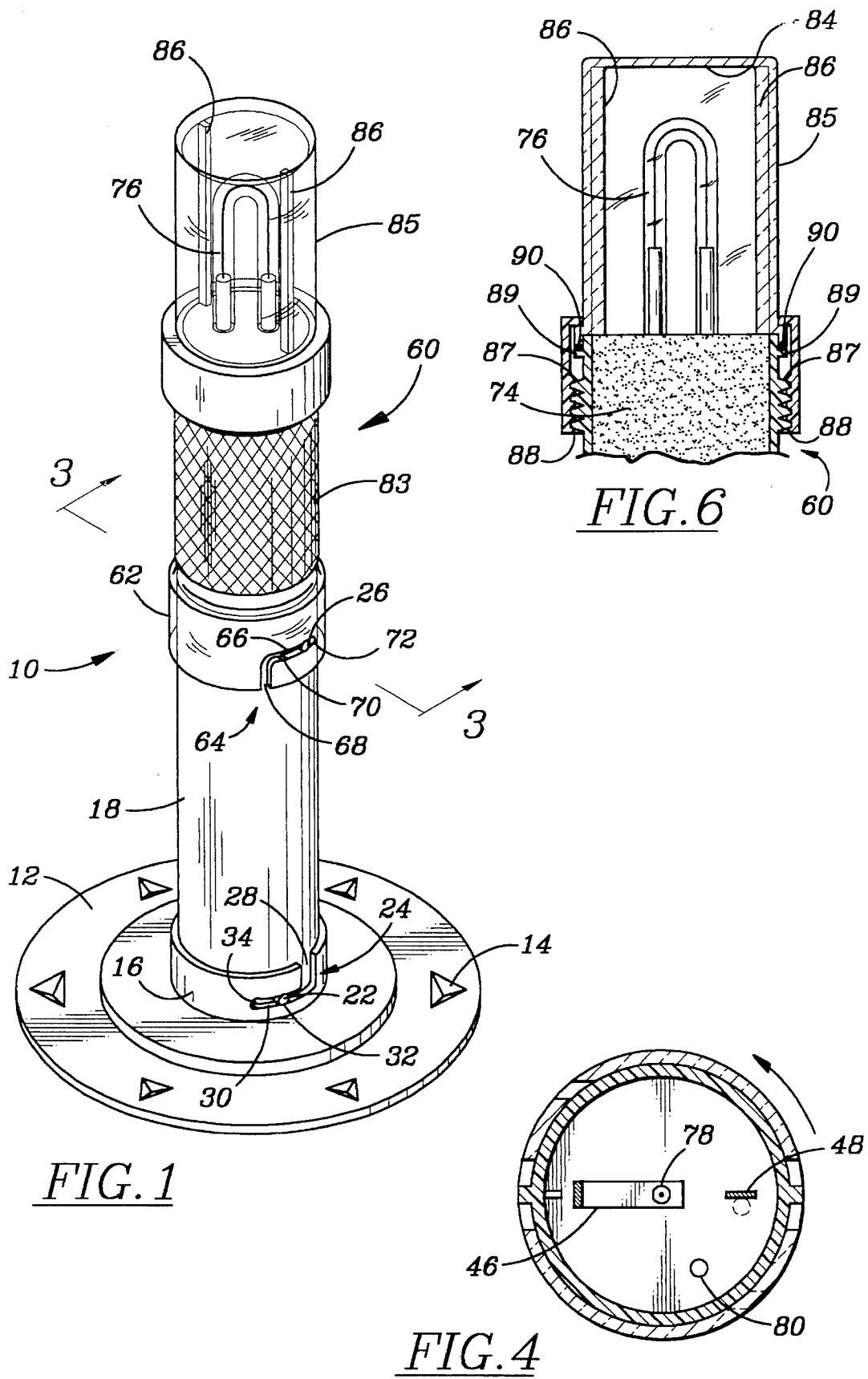
FIG. 1 is an isometric view of the strobe-type, illumination device of the present invention.
Figure 2:
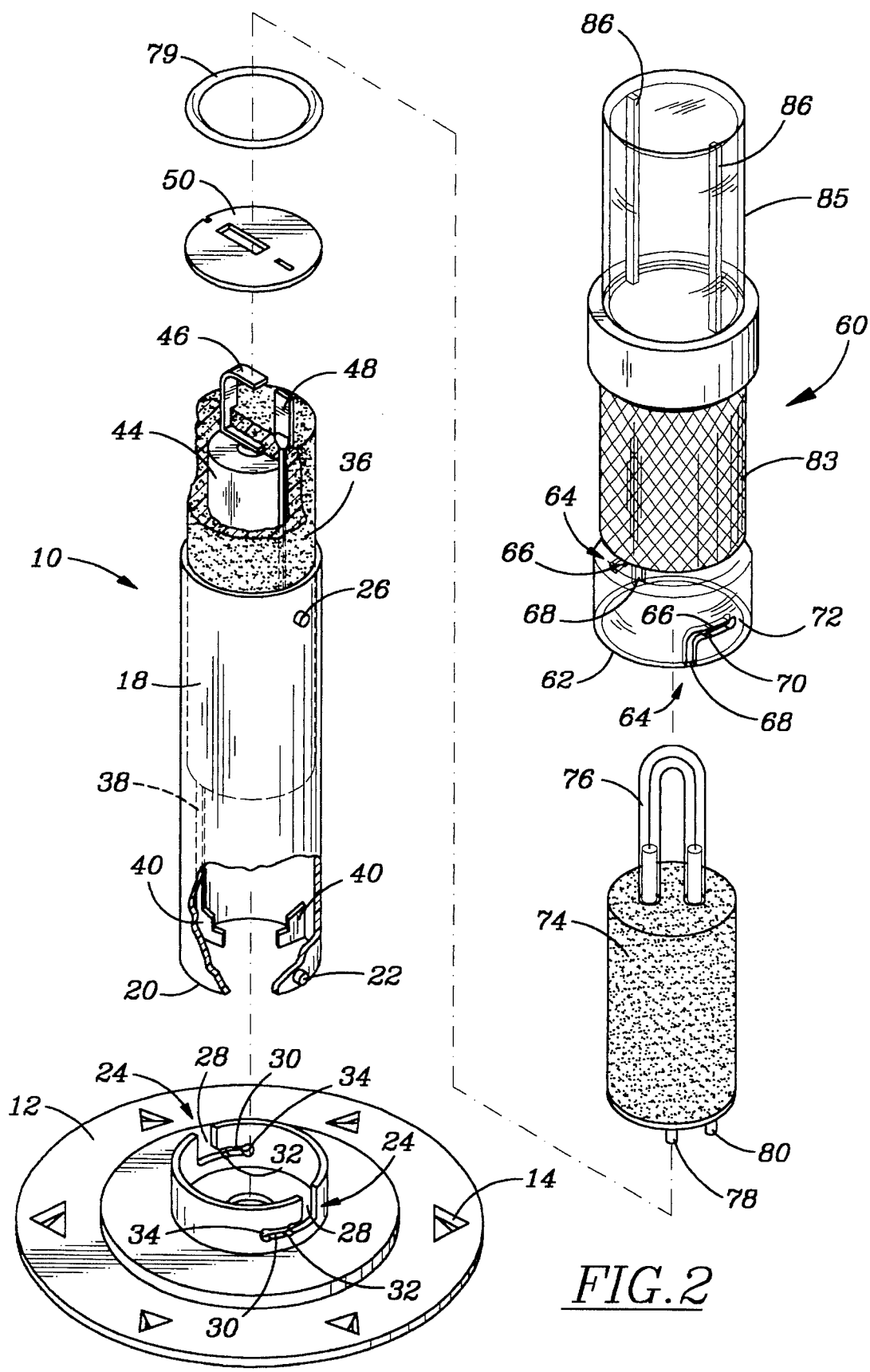
FIG. 2 is a partially cutaway exploded view of the illumination device of FIG. 1.

Referring now to the drawings in detail, wherein like numbers refer to like elements, there is shown in FIGS. 1, 2 and 3, the principal external and internal features of the strobe beacon 10 of the present invention. Starting at the bottom, these comprise a stepped base 12, typically having on the outermost portion thereof, a plurality of downwardly directed projections 14 adapted to improve the stability of the beacon when it is used on wet, muddy, icy or sloping surfaces. Although, the projections 14 are shown in FIGS. 1 and 3 as being punched from the material used to fabricate the base 12, it is to be understood that other methods of attaching the projections 14 to base 12 such as riveting or welding can be used without changing the essential nature of the present invention.

Centered on the upper surface of base 12 and projecting upwardly is a short length of a circular mounting tube 16 into which lower section housing 18 is inserted. Attached at diametrically opposite positions near the base 20 of the lower section housing 18 are a first pair of short locking ferrules 22 which fit into a matching pair of locking channels 24 cut into the side wall of circular tube 16. As particularly shown in FIG. 2, there is also a second pair of locking ferrules 26 mounted at the same diametric orientation near the topmost portion of lower housing 18. As will be explained in detail below, the ferrules 26 are used in the final assembly and operation of the strobe beacon 10.

As shown in FIG. 2, both of the locking channels 24 comprise a short downwardly directed vertical slot section 28 terminating at its lower end at one end of a somewhat longer horizontal slot section 30. Both of the two horizontal slot sections 30 have drilled thereinto two stop points 32 and 34. To assemble and lock lower section housing 18 in place, the housing is merely placed inside circular mounting tube 16 and rotated until the ferrules 20 are aligned with the locking channels 24. Locking is accomplished by first manually pushing down on lower body section 18 until the ferrules 20 reach the bottoms of each of the vertical slot sections 28 and then rotating the lower body section 18 until the ferrules 22 pass the first stop point 32 and come to rest in the second stop point 34. Movement of the ferrules 22 along the horizontal slot sections 30 is facilitated by a slight springiness in that portion of the sidewall of mounting base 16 from which the two locking slots are cut. Two stop points are used to provide additional locking security in situations where the strobe beacon 10 is struck, for example, by an oncoming vehicle such as a car or truck. With the use of the second stop point 34, the probability of the powerpack-containing lower section 18 breaking loose from the mounting tube 16 and base 12 when the beacon device 10 is struck or dropped is significantly reduced.

The strobe beacon 10 is between 1½ to 3 inches in diameter, with the short circular tube section 16 having an internal diameter sized so that while lower housing 18 will fit snugly inside, it can still be rotated easily to lock it in position within mounting tube 16.

Figure 5:
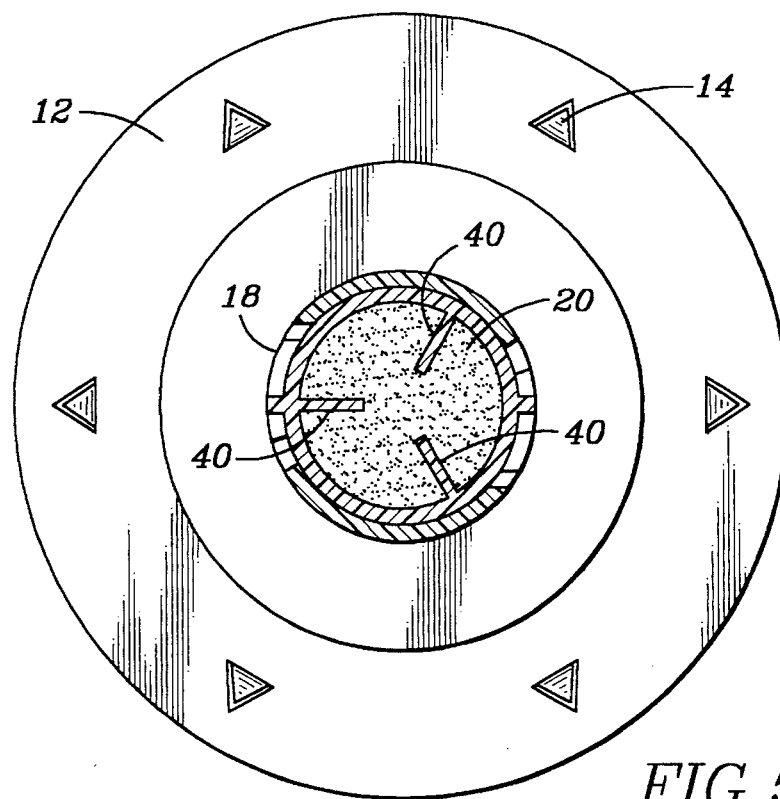
FIG. 5 is a horizontal cross sectional view of the illumination device taken along the line 5—5 in FIG. 3.

Fitted inside the lower section housing 18 is power pack 36, which is centered within the interior space by a plurality of longitudinally oriented internal ribs 38, with two being shown in FIG. 2. Each of the ribs 38 has a small foot 40 resting on the base 20, so that power pack 36, when positioned within the lower section housing 18 will be both centered and firmly supported. The arrangement of the internal ribs 38 and the support feet 40 is shown most clearly in FIG. 5.

As depicted in FIGS. 2 and 3, the power pack 36 comprises at least one, but more usually 2, 3 or 4 dry cell batteries 44 stacked one atop the other in a series circuit. Typically this orientation will provide multiples of 1.5 volt output in direct relation to the number of batteries utilized. Depending on the anticipated use of the beacon, alkaline, lithium or nickel cadmium, single use or rechargeable batteries may be used with equal facility. Contacting the positive terminal of the uppermost cell is positive lead 46, while negative lead 48 extends downwardly inside the confines of power pack 36 to make contact with the outside surface at the base of the lowermost of the batteries in power pack 36.

Also as shown in FIGS. 2 and 3, power pack 36 is typically formed when the batteries 44 and the associated positive and negative leads 46 and 48 are encased in a plastic foam to allow it to be handled as a single unit. The positive and negative leads 46 and 48 respectively, project out through top seal 50 which accomplishes the isolation of the power pack chamber within the lower section housing 18 and essentially protecting the batteries from detrimental ambient or environmental effects. It is also found that such construction makes the insertion and subsequent removal of these power packs 44 into and from the interior of lower body section 18 a fairly simple matter.

As shown most clearly in FIG. 2, positive lead 46 is in a broad flattened horizontally oriented "U" shape with the upper side thereof extending more or less to the midpoint of the open space above battery pack 36. Further, negative lead 48 is a vertically upstanding flat strip located off to the side of said open space. Both terminals, at the ends of the leads 46, 48, being between ¼ to ½ inches wide and projecting up through top seal 50 approximately ½ to ¾ inches. The positioning of these terminals is most clearly shown in FIG. 4.

Located above the lower section 18 and rotatably mounted thereto is the upper section housing 60 which contains the illumination source and the control circuitry. As shown most clearly in FIG. 1, mounting of the upper section 60 to the lower section 18 is accomplished by a slightly larger diameter section 62 located at the bottom of the upper section housing 60 which is adapted to closely fit over the upper portion of lower section housing 18. Cut into the sides of larger diameter section 62 are a second pair of locking channels 64, which are similar in general overall shape to locking channels 24, but having a vertical orientation in which the horizontal slot sections 66 being located at the upper, rather than the lower portions thereof. This allows upper housing 60 to slide down a short distance along side of the outermost portion of the top end of lower housing 18 when the vertical slots 68 are aligned with upper mounting ferrules 26. As shown most clearly in FIG. 8, both of the upper locking channels 64 have drilled into them two stop points 70 and 72 in the horizontally oriented slot portion 66 which are similar in size and shape to stop points 32 and 34.

Final assembly of the strobe beacon 10 is accomplished when upper body section 60 is placed over the top portion of lower body section 18 so that said top portion of the lower tubular section 18 fits into larger diameter section 62 and then rotated until the ferrules 26 come to rest in the first stop position 70. This position is considered to be a "locked" position and denoted by the solid dot [•]. As in the case with the assembly of the lower body section 18, only a slight downward pressure is needed to push the upper body section 60 downward along the ferrules 26 and rotate it to this locked position. Alternatively, the first and second stop positions 70, 72 may be located on either side of the vertical slots 68 of the locking channels 64 and accomplish the identical function of retaining the upper tubular section 60 in locking relationship with the lower tubular section 18.

Fitted inside of upper body section 60 is light source 74. In addition to xenon lamp 76, this comprises a pair of downwardly extending contacts 78 and 80 which connect to the ends of the filament passing throught the envelope of lamp 76 and a control circuit 82. Contact 78 is more or less centrally located and of sufficient length so as to make a firm contact with the positive lead 46 extending upward from the top portion of power pack 36 when the strobe beacon 10 is fully assembled. Contact 80 is positioned off to the side to make contract with the negative lead 48 of the power pack 36. Enabling of the light source occurs when upper body section 60 is rotated to the second stop or "operating⇆ position 72 within horizontal slot 66 indicated by the illuminated dot. The rotation is accomplished through the counter-rotation of the upper and lower tubular sections 60, 18 as the two sections are gripped and rotated oppositely of each other. When this is done, contact 80 touches the upwardly extending negative lead 48 thus completing the circuit and activating beacon 10. Completing the construction of the seal between the upper and lower tubular sections 60, 18 is a seal means 79, which is depicted in FIGS. 2 and 3 as an O-ring seal, for the purpose of providing a seal which is impenetrable by moisture, particulate matter of very fine dimensions, and similar substances. This type of construction is inherently free of the corrosion problems noted as being common with conventional on-off switches typically used in present day state-of-the-art beacons.

Figure 7:
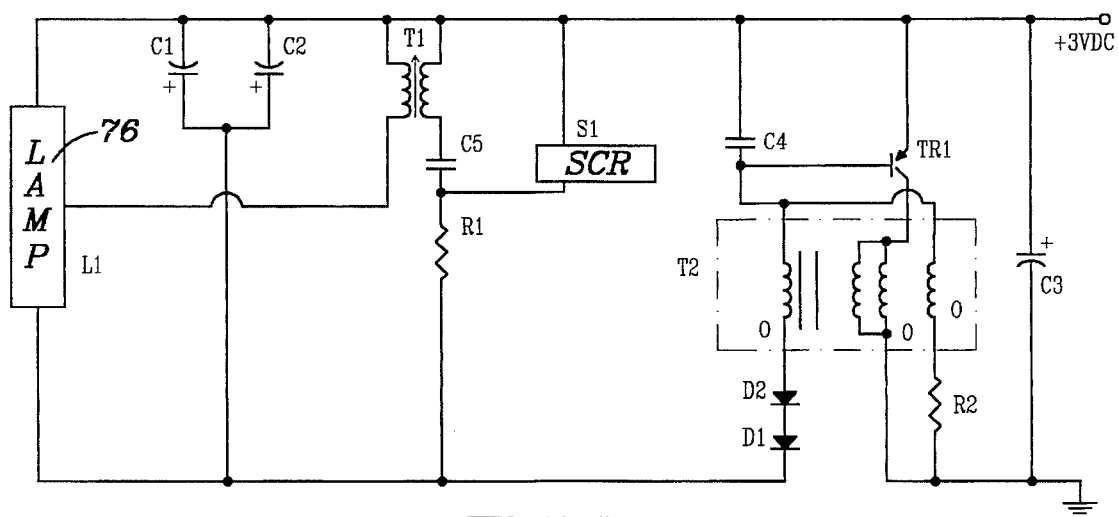
FIG. 7 is a circuit diagram for the pulsed flash control system as used in the present invention.

Flashing of the light source is accomplished under the control of circuit 82 which is shown schematically in FIG. 7. The circuit depicted is that configuration of electrical circuit elements which have been previously used to power strobe-type devices. In this example a three volt dc source is applied to the primary winding of transformer T1 which is capable of withstanding a switching frequency of 40 kHz and which has a current peak approaching five amperes. The secondary winding of transformer T1 achieves a 350 volt potential which is used to charge capacitors C1 and C2 in approximately 0.5 seconds. Once charged there is an instant draw on capacitors C1 and C2 of approximately 750 mA approximately every 0.5 seconds as long as the 350 volt dc potential is present in the secondary coil of the transformer T1. This will permit the flashing of the xenon lamp 76 in accordance with the charge and discharge of the capacitors C1 and C2 at a maximum energy level of 15 joules with an average power factor of eight watts.

The elements of the circuit 82 are preferred to have the following electrical values. C1 and C2 are 22 μf (400 vdc) capacitors, C3 is a 330 μf (10 vdc) capacitor, C4 is a 0.022 μf (50 vdc) mica capacitor, and C5 is a 0.22 μf (250 vdc) capacitor. R1 is 1M ohm (¼ watt) metal film resistor and R2 is a 200 ohm (¼ watt) metal film resistor. Diodes D1, D2 are of the 1N4004 type. S1 is an SCR switching rectifier obtained from Teccor, Part No. K1100E70. Transformer T1, other than as described above, also contains a trigger coil and has a rating of 4 Kv. Transformer T2 is a custom wound transformer utilized to balance the load when the lamp L1 [76] is discharged. Lamp L1 [76] is a "D" shaped xenon flash tube having a 6 watt rating. Finally, transistor TR1 is of the MJE2955 type.

The difficulty in designing the circuit 82 for the strobe beacon 10 is the necessity to balance the low voltage battery source of the circuit with the high voltage requirement for driving the xenon lamp 76. Significantly, the current draw has to be kept to an absolute minimum to provide a cost effective life expectancy of the battery source with a minimal mass of the same for environmental reasons. Consonant with this is the requirement to provide maximum light output and long-life for the power source. In accordance with this the circuit has been adapted to conform with the requirements of the present invention of providing a minimal mass and low voltage battery power source and a significantly higher pulsed voltage for obtaining maximum power output and control of the xenon lamp 76. It is expected using a battery source as discussed above that the life expectancy of the battery power source will be in excess of 300 hours of actual use.

The detection distance of the illumination of the xenon lamp 76 of the strobe beacon 10 during high ambient light conditions is greater than 2500 feet. During low ambient light conditions, the detection distance is greater than one mile. To further enhance the distance from which the beacon 10 may be detected, a light reflectance means 83 is applied to the exterior of the lower portion of the upper tubular section 60. The light reflectance means 83 is preferred to include a light reflectance diffusion pattern depicted as "lattice-work" or "cross-hatching" in FIGS. 1 and 2. The light reflectance means 83 also increases the continued detectability of the beacon 10 at much closer ranges as the light emitted from the lamp 76 may be washed out, or overpowered, by vehicle mounted lights. The ability of the beacon 10 to reflect impinging light from vehicles further enhances its use as both a hazard warning device and as a navigational aid, especially in landing aircraft.

To simplify the construction of the overall system, upper portion of the upper tubular section 60, which upper portion will be described as a lamp housing 85, is typically made of a strong engineering transparent plastic, such as Lexan or Lucite. Also typically, the topmost end of lamp housing 85 is made of an opaque material 84 which serves to prevent any significant amount of light from being projected in an upward direction. This is shown most clearly in FIG. 6. Further, the lamp housing or lens means 85 is threadedly detachable from the upper tubular section 60 by the rotation of the lamp housing 85 oppositely to the upper tubular section 60. Cooperating threads 87 (which surround the upper tubular section 60) and threads 88 (which are disposed around the internal circumference of the lower end of the lamp housing 85) are screwably detachable from each other for the purposes of lamp replacement and for exchange of lamp housing 85 for another as described below. To effectively seal off unwanted moisture and very small particulate material from entering into the upper tubular section 60 of the beacon 10 through the threads 87, 88 of the lamp housing 85, another O-ring seal 90 is placed adjacent the inner threads 88 to contact against a flange 89 positioned at the top end of the upper tubular section 60.

The lamp housing or lens means 85 is designed for passing all light wavelengths emitted from the lamp 76 or for only passing one or more predetermined wavelengths of light. In one specialized application the lens means 85 is constructed to filter out all but the infra-red wavelengths of light to facilitate aircraft landing in relative darkness by using the beacon 10 as a navigation and landing guidance device. The limited infra-red light spectrum can be seen by the use of certain types of night vision devices such as used by the military. In another specialized application the lens means 85 is constructed to filter out all but ultra-violet wavelengths of light to enhance and aid navigational finding devices in darkness. In another specialized application the lens means 85 is constructed to filter out all but a specific wavelength of colored light to enhance the use of the beacon 10 as a hazard warning device for land vehicle traffic or as an enhanced navigational aid for aircraft. Hence, the substitution or exchange of one lamp housing or lens means 85 for another can significantly enhance the utility of the strobe beacon 10 as a hazard warning device or navigational aid.

As was the case with battery pack 36, light source 74, containing the control circuit 82 and with the lamp 76 extending outward, is preferably potted in a plastic foam so that it can be easily handled. Proper positioning of the xenon lamp 76 within the confines of upper section housing 60 is assured by a set of internal ribs 86 are extending the length of the upper housing 60 and the other only partway. The ribs 86 center and confine the light source 74 within the tubular upper section housing 60. Preferably the foam potting is soft enough for the ribs 86 to dig into so that the light source is firmly held in position.

It should be understood that various changes in the details, materials and arrangement of the elements which have been described and illustrated in order to explain the nature of the present invention may be made by those skilled in the art without departing from the spirit and principles of the invention; and accordingly, reference should be made to the appended claims, rather than the foregoing specification, as indicating the scope of the invention.

We claim:

1. A strobe hazard warning beacon comprising a power source, a light source comprising a lamp means and a pulsing means for controlling the light emissions from said lamp means, and a lens means for limiting the light emissions of said lamp means to one or more predetermined wavelengths, said beacon further comprising a lower body section adapted to contain said power source and an upper body section adapted to contain said light source and said pulsing means, said upper and lower body sections being rotatingly mated to the other by a pair of substantially diametrically opposed locking channels, said lower body section containing said power source having upwardly extending positive and negative terminals adapted to mate with a like pair of downwardly oriented terminals from said upper body section to form a switch means operable by the counter-rotation of the upper body section to the lower body section for enabling said pulsing means and said lamp means only when said upper body section and said lower body section are rotated from a first position to a second position, said upper body section having focusing means adapted to project pulsed light emissions substantially 360° in the horizontal direction and to prevent light emissions from being projected in the vertical direction and light reflectance means surrounding a lower portion of said upper body section for reflecting light impinging upon said beacon, said beacon further comprising a base adapted to lockingly engage with said lower body section and having a plurality of downwardly directed projections adapted to provide stability to said beacon for use on a surface.

2. The strobe hazard warning beacon of claim 1 wherein said lens means is detachably connected to said upper body section and being interchangeable with other lens means for effecting the emission of one or more other predetermined wavelengths of light.

3. The strobe hazard warning beacon of claim 1 wherein the light reflectance means being arranged in a diffusion reflectance pattern for enhancing closer range detection of said beacon.

4. The strobe hazard warning beacon of claim 1 further comprising means for firmly holding said power source within said lower section.

5. The strobe hazard warning beacon of claim 1 further comprising means for firmly holding said light source within said upper section.

6. The strobe hazard warning beacon of claim 1 wherein said power source has an operating range from 3 to 12 volts dc.

7. The strobe hazard warning beacon of claim 1 wherein said lamp means is a xenon gas filled bulb.

8. The strobe hazard warning beacon of claim 1 wherein said focusing means of said upper body section is made from substantially transparent, shock resistant plastic material.

* * * * *